United States Patent
Cranch et al.

(10) Patent No.: US 7,324,714 B1
(45) Date of Patent: Jan. 29, 2008

(54) MULTICORE FIBER CURVATURE SENSOR

(75) Inventors: Geoffrey A. Cranch, Fairfax Station, VA (US); Gordon M. H. Flockhart, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/733,962

(22) Filed: Apr. 11, 2007

(51) Int. Cl.
*G02B 6/00* (2006.01)
*G02B 6/34* (2006.01)

(52) U.S. Cl. .......................... 385/12; 385/13; 385/37; 385/126; 250/227.16

(58) Field of Classification Search ................ 385/12, 385/13, 37, 32, 126; 250/227.16, 227.19, 250/227.17
See application file for complete search history.

(56) References Cited

U.S. PATENT DOCUMENTS

| 5,563,967 | A | 10/1996 | Haake |
| 6,389,187 | B1 | 5/2002 | Greenaway |
| 2003/0072515 | A1 | 4/2003 | Ames |
| 2007/0201793 | A1* | 8/2007 | Askins et al. ............. 385/37 |

OTHER PUBLICATIONS

Flockhart, G. M. H., Macpherson, W. N., Barton, J. S., Jones, J. D. C., Zhang, L., and Bennion, I. "Two-axis bend measurement with Bragg gratins in multicore optical fiber", Opt. Lett., 2003, 28, (6). pp. 387-389.

Bethuys, S., Lablonde, L., Rivoallan, L., and Auvray. P., "1 × 4 fused multicore singlemode fibre coupler: theory, fabrication and analysis", E;ectron. Lett., 1998, 34, (15), pp. 1516-1517.

Dandridge, A., Tveten, A. B., Giallorenzi, T. G., 1982 "Homodyne demodulation scheme for fiber optic sensors using phase generated carrier" IEEE J Quant Elec., 18 (10) 1647-1653.

Cranch, G. A., Flockhart, G. M. H., Kirendall, C. K., "Polarization properties of interferometrically interrogated fiber Bragg grating and Tandem-inteferometer strain sensors" J. Lightw. Technol., 24 (4), (2006).

Flockhart, G. M. H., Cranch, G. A., Kirkendal, C. K., Differential phase tracking applied to Bragg gratings in multicore fibre for high accuracy curvature measurement submitted to Elec. Lett.

Cranch, G. A. Flockhart, G. M. H., Kirkendall, C. K., "Efficient Fiber Bragg grating and fiber Fabry-perot sensor multiplexing scheme using a broadband, pulsed mode-locked laser" J. Light Tech., 23, 11, 2005.

Cranch, G. A., Flockhart, G. M. H. Kirkrendall, C. K., "Time division multiplexing of fiber Bragg grating sensors using a mode-locked fiber laser source" Proc. 17th Int. Conf. on Optical Fib. Sensors, SPIE 5855, pp. 238-241, May 2005.

* cited by examiner

*Primary Examiner*—Hemang Sanghavi
(74) *Attorney, Agent, or Firm*—John J. Karasek; Suresh Koshy

(57) ABSTRACT

An apparatus includes a multicore fiber including three cores. The three cores include two pairs of cores, each pair of cores lying in a plane. The planes of the two pairs of cores are non-coplanar. The multicore fiber includes a rosette, the rosette including three coplanar interferometers. Each interferometer of the three interferometers are located in a respective core of the three cores. Each interferometer includes a first reflector and a second reflector. The first reflectors of the rosette are coplanar. The second reflectors of the rosette are coplanar.

19 Claims, 6 Drawing Sheets

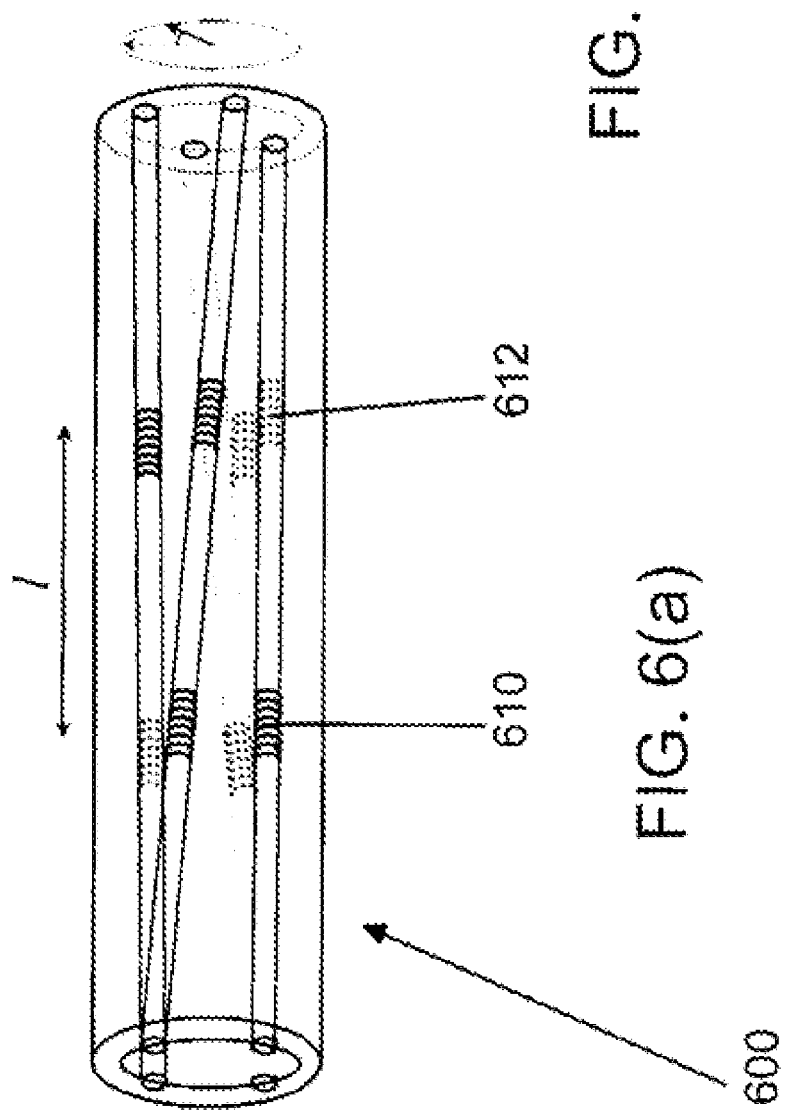

MULTICORE FIBER CURVATURE SENSOR

TECHNICAL FIELD

The present invention relates generally to curvature sensors, and more particularly to fiber optic curvature sensors.

BACKGROUND ART

Sensors that can directly measure curvature are desirable for a number of reasons. In applications where the sensor is embedded within the structure, the precise location of the sensor need not be known in order to determine the curvature. This is important for composite materials in which the sensor location may change during the cure process. Curvature sensors can also be located along the neutral axis of the structure where the bending strain is zero and hence is not a suitable location for strain gauges. A direct measurement of curvature is increasingly important for thin structures where the bending strain is considerably reduced.

Previous methods of shape measurement using fiber-optic sensors (e.g., U.S. Patent Application Publication application Ser. No. 20030072515 to G. H. Ames et al., incorporated herein by reference) have used separate Bragg grating strain sensors bonded to opposing sides of a structure that is subject to bending. The differential strain measured by the fiber Bragg gratings ("FBGs") yields the curvature of the structure. However, the mechanical arrangement is critical to the accuracy of the measurement. The accuracy is dependent on good strain transfer between the host structure, the fiber buffer and the optical fiber. Care must also be taken to avoid temperature gradients across the structure which would lead to erroneous bend measurements. Inscribing Bragg grating strain sensors into separate cores of a multicore fiber ("MCF") and measuring the differential strain between cores yields a greatly improved sensor. The fused silica structure provides excellent mechanical stability and the core spacing is very stable. Also, due to the close proximity of the FBGs (typically 50-100 microns), the sensitivity to temperature gradients is greatly reduced and temperature independent measurement of curvature is possible, such as discussed in Flockhart et al., "Two-axis bend measurement with Bragg gratings in multicore optical fiber," Opt. Lett. 2003, 28 (6), pp. 387-389, incorporated herein by reference. However, the close proximity of the cores also reduces the curvature sensitivity (the differential strain between two cores in the MCF subjected to a curvature of 1/R, where R it the radius of curvature, is proportional to their physical separation). Small optical fiber diameters are desirable for smart structure applications where the optical fiber is embedded into the structure. Thus, to increase the response to bending, the cores of the MCF can be configured to be Fabry-Perot cavities. This has been described in, for example, U.S. Pat. No. 6,301,420 to Greenway et al., incorporated herein by reference, and U.S. Pat. No. 6,389,187 to Greenway et al., incorporated herein by reference.

Another MCF sensor has also been described in U.S. Pat. No. 5,563,967 to J. Haake, incorporated herein by reference. This sensor comprises two cores in which fiber Bragg grating strain sensors are formed. Each sensor comprises two FBGs, one in each core. Their Bragg wavelengths are made largely different such that their response to temperature and strain is different. This permits both temperature and strain to be measured and hence provide a measure of one independent of the other.

DISCLOSURE OF THE INVENTION

An embodiment of the invention includes an apparatus. The apparatus includes a muticore fiber including three cores. The three cores include two pairs of cores, each pair of cores lying in a plane. The planes of the two pairs of cores are non-coplanar. The multicore fiber includes a rosette, the rosette including three coplanar interferometers. Each interferometer of the three interferometers are located in a respective core of the three cores. Each interferometer includes a first reflector and a second reflector. The first reflectors of the rosette are coplanar, the second reflectors of the rosette being coplanar.

Optionally, for each interferometer, the first reflector includes a first fiber Bragg grating, the second reflector includes a second fiber Bragg grating, the first fiber Bragg grating and the second fiber Bragg grating include a substantially similar fiber Bragg resonance. Optionally, the apparatus further includes a reference reflector adjacent to each interferometer; the reference reflector includes a third fiber Bragg grating including a second fiber Bragg resonance outside a bandwidth of said first fiber Bragg resonance. Optionally, the apparatus includes a reference reflector with each interferometer, the reference reflector includes a third fiber Bragg grating comprising a second fiber Bragg resonance outside the bandwidth of the first fiber Bragg resonance.

Optionally, the three cores includes substantially similar material.

Optionally, the apparatus includes a first section and a second section, the rosette including a first rosette and a second rosette, the first section including the three cores tracing a helical path centered about the central fiber axis and the second section including the three cores parallel to each other and the central fiber axis. The first section includes the first rosette and/or the second section includes the second rosette.

Optionally, the apparatus include a path-matching interferometer communicating with the multicore fiber. Optionally, the path-matching interferometer includes a Mach-Zehnder interferometer, a Michelson interferometer, or a low-finesse Fabry-Perot interferometer. Optionally, the Michelson interferometer includes plurality of Faraday rotator mirrors.

Optionally, the apparatus includes a continuous wave light source and a pulsed broadband light source. Optionally, the continuous wave light source includes an erbium light source, a praseodymium light source, a semiconductor optical amplifier, a super continuum light source, or a super luminescent diode, and the pulsed broadband light source includes a semiconductor optical amplifier, a mode locked laser or a switched super luminescent diode.

Another embodiment of the instant invention includes a method. Launched light is coupled to a multicore fiber including three cores, the three cores including two pairs of cores, each pair of cores including a plane, the planes of the two pairs of cores being non-coplanar, the multicore fiber including a rosette, the rosette including three interferometers, each interferometer of the three interferometers being located in a respective core of the three cores, each interferometer including a first reflector and a second reflector, the first reflectors of the rosette being coplanar, the second reflectors of the rosette being coplanar. Reflected light is received from the interferometers. The received reflected light is demultiplexed to extract interferometric signals from the three interferometers.

Optionally, the method further includes the following. A beam is transmitted from a light source into a path-matching interferometer. A beam is transmitted from the path-matching interferometer. The beam transmitted from the path-matching interferometer is split into at least three paths. The three paths are passed through a splitter to separate the launched light from the reflected light. Optionally, the passing of the three paths through a splitter to separate the launched light from the reflected light includes passing the three paths using a circulator or a coupler.

Optionally, the demultiplexing of the received reflected light to extract interferometric signals from the three coplanar interferometers includes the following. The received light is spectrally separated using a wavelength demultiplexer into wavelength channels. The wavelength channels are transmitted to respective detectors.

Optionally, the demultiplexing of the received reflected light to extract interferometric signals from the three interferometers includes the following. The light at each wavelength is separated using a time division demultiplexer into a plurality of time channels, each time channel of the plurality of time channels comprising a respective interferometric signal from a respective interferometer of the three interferometers.

Optionally, the demultiplexing of the received reflected light to extract interferometric signals from the three interferometers includes the following. The received light is separated from the three interferometers using a time division demultiplexer into a plurality of time channels, each time channel of the plurality of time channels comprising a respective interferometric signal from a respective interferometer of the coplanar interferometers.

Optionally, the light source comprises a continuous wave light source or a pulsed broadband light source. Optionally, the continuous wave light source includes an erbium light source, a praseodymium light source, a semiconductor optical amplifier, a super continuum light source, or a super luminescent diode, and the pulsed broadband light source includes a semiconductor optical amplifier, a mode locked laser or a switched super luminescent diode.

BRIEF DESCRIPTION OF THE DRAWINGS

FIG. 6(a) is a perspective view of a twisted curvature sensor according to an embodiment of the instant invention.

FIG. 6(b) is an illustrative representation of bias twist according to an embodiment of the instant invention.

FIG. 6(c) is an illustrative representation of a radius of an embodiment of the instant invention for determining phase responsivity, for example.

BEST MODES FOR CARRYING OUT THE INVENTION

Figure 1B:
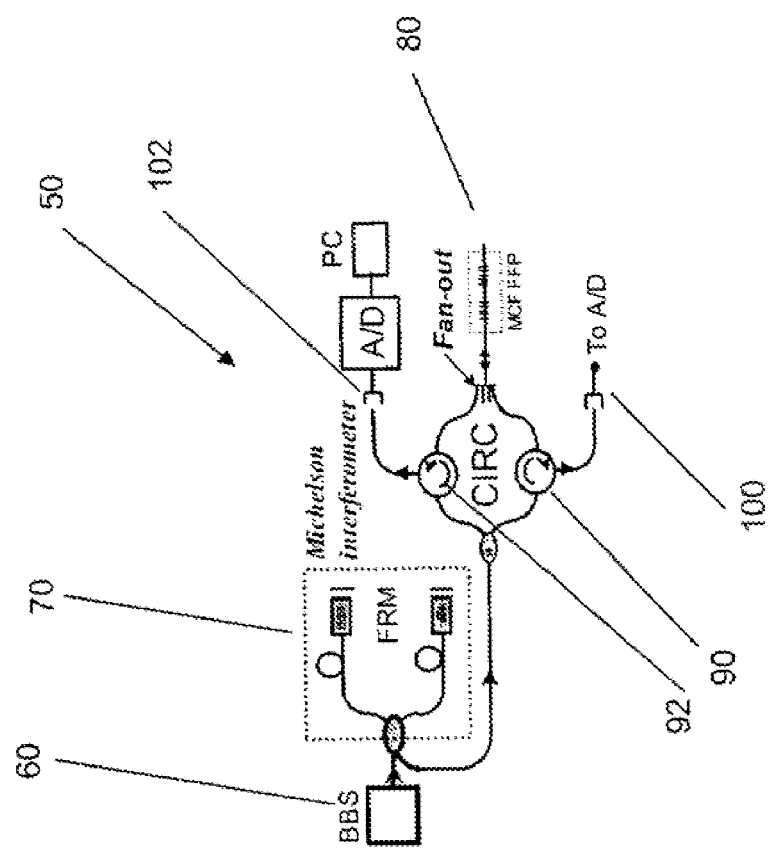
FIG. 1(b) is a schematic view of an illustrative curvature sensor system according to an embodiment of the instant invention.
Figure 1A:
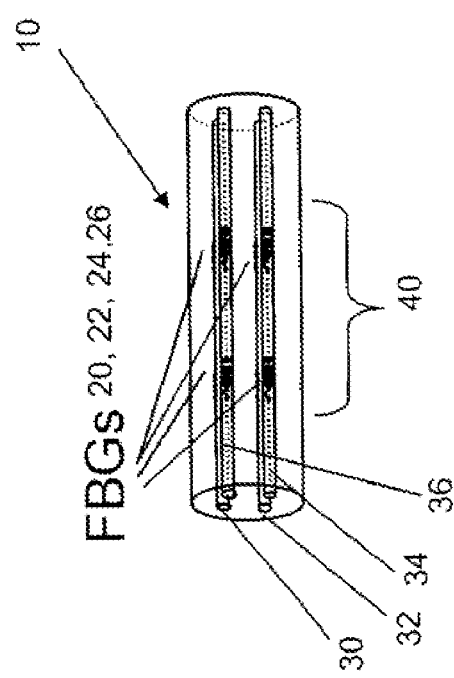
FIG. 1(a) is a perspective view of a curvature sensor according to an embodiment of the instant invention.

A MCF Fabry-Perot curvature sensor 10 formed with FBGs according to an embodiment of the instant invention is shown by way of example in FIG. 1(a). It includes, for example, two sets of four FBGs 20, 22, 24, 26 formed into the cores 30, 32, 34, 36 of the MCF 10 forming four fiber Fabry-Perot ("FFP") cavities. The reflectivities of the FBGs 20, 22, 24, 26 are made sufficiently low (~<5%) such that the response of the FFP resembles a Michelson interferometer (MI). The conventional FFP interferometer is a multiple beam interferometer. An interference signal is generated by the reflection from each FBG. Assuming that the interferometer is illuminated by a monochromatic source and that there is no birefringence or attenuation in the sensor fiber, then in reflection the FFP produces Fizeau fringes and the intensity response is given by:

$$I(\phi) = I_{inc}\left[1 - \frac{(1-r_1)(1-r_2)}{1 + r_1 r_2 - 2\sqrt{r_1 r_2} \cos(\phi)}\right] \quad (1)$$

where $r_1$, $r_2$, are the FBG reflectivities, $I_{inc}$ is the incident intensity and the interferometric phase is given by $$\phi = 4\pi n L_m / \lambda_b.$$

A low finesse FFP allows use of the approximate relation $(1+r)^n \sim 1+nr$, where equation (1) reduces to, $$I \approx 2r_{fbg} I_{inc}(1 - \cos(\phi) + 2r_{fbg}\cos(\phi)(1-\cos(\phi)) \quad (2)$$
$$\approx 2r_{fbg} I_{inc}(1 - \cos(\phi))$$

which resembles the response of the two beam Michelson interferometer. The last term in equation (2) generates a small distortion in the response, if r is not sufficiently low. The FBGs 20, 22, 24, 26 are typically a few millimeters in length and are separated by a few centimeters. The Bragg wavelength of the FBGs 20, 22, 24, 26 in separate cores 30, 32, 34, 36 are similar but need not be identical, due to differences in refractive index of the cores. However, the Bragg wavelengths of the two reflectors in a single core must spectrally overlap in order to form an interferometric cavity. When the fiber 10 is subject to bending in the plane of two pairs of cores 30, 32, 34, 36, the center of the fiber forms the neutral axis and the cores experience equal and opposite strain. Interrogation of the FFPs is achieved with a matched interferometer. This could be either a Mach-Zehnder, Michelson or Bragg grating defined Fabry-Perot. The set of Fabry-Perot cavities that make up a 2D curvature sensor are referred to as a rosette 40.

An illustrative system 50 including the MCF-FFP sensor according to an embodiment of the instant invention is shown in FIG. 1(b). The output of a broadband source ("BBS") 60 (such as erbium doped fiber source) is injected into a Michelson interferometer ("MI") 70. The MI 70 optionally incorporates Faraday rotation mirrors ("FRM") which suppress effects on the fringe visibility due to birefringence in the optical fiber. The output of the MI 70 is split into two or more paths, and each path is connected to a core of the MCF through a fan-out 80. The optical path imbalance in the MI 70 is matched to the optical path imbalance in the MCF-FFPs, such that an interference signal is generated on detection. The signals reflected from the FFPs are separated using a circular ("CIRC") 90, 92 and are detected on photodiodes 100, 102. Interrogation of only two cores is shown in FIG. 1(b) for the purpose of ease of illustration only. By further splitting the output of the MI 70, all four cores 30, 32, 34, 36 of the MCF 10 can be interrogated simultaneously.

The total phase of each Tandem interferometer corresponding to core m is given by:

$$\phi_m = 4\pi/\lambda_m \cdot (n_{MI}L_{MI} - n_m L_m) \quad (3)$$

where $\lambda_m$ is the Bragg wavelength of the FBGs 20, 22, 24, 26, $n_{MI}$ is the refractive index of the fiber making up the MI 70, $L_{MI}$ is the fiber path imbalance of the MI, and $n_m$ and $L_m$ are the effective refractive index and the fiber length, respectively of the Fabry-Perot cavity in core m. The phase shift corresponding to FFP cavity m is then given by, $$\Delta\phi_m = (4\pi/\lambda_m)[\zeta n_{MI}\Delta L_{MI} + L_{MI}\zeta_{MI}\Delta T_{MI}] - (4\pi/\lambda_m)[\zeta n_m \Delta L_m + L_m \zeta_m \Delta T_m] - (2\pi OPD_m/\lambda_m^2)\Delta\lambda_m \quad (4)$$

where $\zeta$ is the stress-optic coefficient and is equal to ~0.78. $\zeta = \partial n/\partial T|$, is the thermo-optic coefficient, which is assumed to be the same for each core, $OPD_m 2n_{MI}L_{MI} - 2n_m L_m$ is the effective optical path imbalance, $\Delta T_{MI}$ and $\Delta T_m$ are the temperature change of the MI 70 and MCF-FFP cavity respectively, and $\Delta L$ is a length change. Assuming $L_m = L_{m-1}$ and $OPD_m = 0$, then the difference in phase between two cavities is as follows.

$$\Delta\phi_m - \Delta\phi_{m-1} = 4\pi\partial \cdot [(n_m/\lambda_m)\Delta L_m - (n_{m-1}/\lambda_{m-1})\Delta L_{m-1}] \quad (5)$$

In practice, the refractive index of the cores may not be equal. In which case the differential length change between two cores can be calculated from, $$4\pi\partial \cdot [\Delta L_m - \Delta L_{m-1}] \sim (\lambda_m/n_m)\Delta\phi_m - (\lambda_{m-1}/n_{m-1})\Delta\phi_{m-1}.$$

Thus, the difference phase is related only to the changes in length $\Delta L_m$ and $\Delta L_{m-1}$ of the two FFPs and phase changes due to environmental effects on the MI 70 are nominally cancelled providing the cores remain in thermal equilibrium. If the fiber 10 is subjected to uniform curvature, then the differential strain is related to the curvature by $$\Delta\epsilon = (\Delta L_m - \Delta L_{m-1})/L_m = d/R$$

where d is the core spacing (=50 μm for this MCF) and R is the radius of curvature. The curvature is defined as 1/R. Taking $\lambda_R = 1550.5$ nm. n=1.468, and L=6.1 cm yields a responsivity, $\Delta\phi/\Delta\epsilon$ for the FFP of ~0.57 rads/με. A phase-generated carrier demodulation method is optionally used to extract the phase. An example of such a phase-generated carrier demodulation method is described in A. Dandridge et al., 1982, "Homodyne demodulation scheme for fiber optic sensors using phase generated carrier," IEEE J. Quant. Elec. 18 (10) 1647-1653, incorporated herein by reference. The phase carrier signal is applied to a piezo-electric fiber stretcher placed in one arm of the MI. The processing stages for this method are now briefly described. Assuming, for example, that the split ratio of the directional coupler in the MI is 50% and that there is no excess loss in either interferometer arm, the current generated by the photodetector is given by, $$i_{pb} = r_d P(1 + V\cos[\phi_{PR}\cos\omega_{PR}t + \Delta\phi(t)]) \quad (6)$$

where $r_J$ is the photodiode responsivity, P is the peak return power in the absence of the interference term, V is the normalized fringe visibility, $\phi_{PR}$ is the modulation depth, and $\Delta\phi(t)$ includes signal and drift phases. Expanding the cosine term in equation (6) in terms of Bessel coefficients yields the following.

$$i_{ph} = r_d P + \qquad (7)$$
$$r_d PV \left[ \left[ J_o(\phi_{pgc}) + 2\sum_{k=1}^{\infty} (-1)^k J_{2k}(\phi_{pgc})\cos 2k\omega_{pgc}t \right] \cos\Delta\phi(t) - \right.$$
$$\left. \left[ 2\sum_{k=0}^{\infty} (-1)^k J_{2k+1}(\phi_{pgc})\cos((2k+1)\omega_{pgc}t) \right] \sin\Delta\phi(t) \right]$$

Thus, quadrature components of the phase of interest $\Delta\phi(t)$, can be obtained by synchronous detection of the photodiode current at $\omega_{PRc}$ and $2\omega_{PS}$. Low pass filtering the resulting signals yields the following.

$$r_d PVJ_t(\phi_{PRc})\sin\Delta\phi(t) \quad (8)$$

$$-r_d PVJ_T(\phi_{PR})\cos\Delta\phi(t) \quad (9)$$

The phase is obtained by normalizing the amplitudes of equations (8) and (9) and taking the arctangent of their ratio. Setting $\phi_{PRc}$ equal to 2.6 radians results in $J_1 \sim J_2$; however, a suitable normalization routine is also applied in the signal processing to remove any small differences in amplitude. Phase excursions greater than pi radians can be measured by implementing a fringe counting algorithm. When a low frequency phase modulation of amplitude pi radians is also applied to the MZ1, plotting equations (8) and (9) as a Lissajous figure traces out a circle. The accuracy to which the amplitudes of equations (8) and (9) are matched determines the phase measurement accuracy. It is understood that other interrogation techniques, such as heterodyne and pseudo-heterodyne interrogation, are optionally used.

The cavity lengths must be closely matched to the path imbalance in the MI 70, but need not be identical. Any mismatch in length must be less than the coherence length of the light reflected from the FBG, which is given by, $$L_c = c/(4\pi\Delta\nu)$$

where $\Delta\nu$ is the rms half-width of the related line shape, and which for a Gaussian beam shape is related to the full-width half maximum $\Delta\lambda_{FWHM}$, by $\Delta\nu = c\Delta\lambda_{FWHM}/(4\sqrt{\ln 2}\lambda_n^2)$. For $\Delta\lambda_{FWHM} = 0.2$ nm this yields $L_c = 3.2$ mm. For path mismatches larger than $L_c$, the fringe visibility will cause a reduction in sensitivity. The thermo-optic coefficients of the MCF cores 30, 32, 34, 36 should also be matched. Any differences will yield incomplete cancellation of temperature induced phase shifts. Ultimately, the effectiveness with which the MCF-FFP sensor 10 can reject phase shifts due to axial strain and temperature will depend on how closely the path lengths in the cavities and the MI 70 are matched, and how closely the thermo-optic coefficients of the MCF cores 30, 32, 34, 46 are matched, according to equation (4). For example, a difference in the thermo-optic coefficient of 1% between two core pairs will cause a temperature induced signal to appear in the differential phase with a magnitude 1% of the total temperature excursion.

Figure 2:
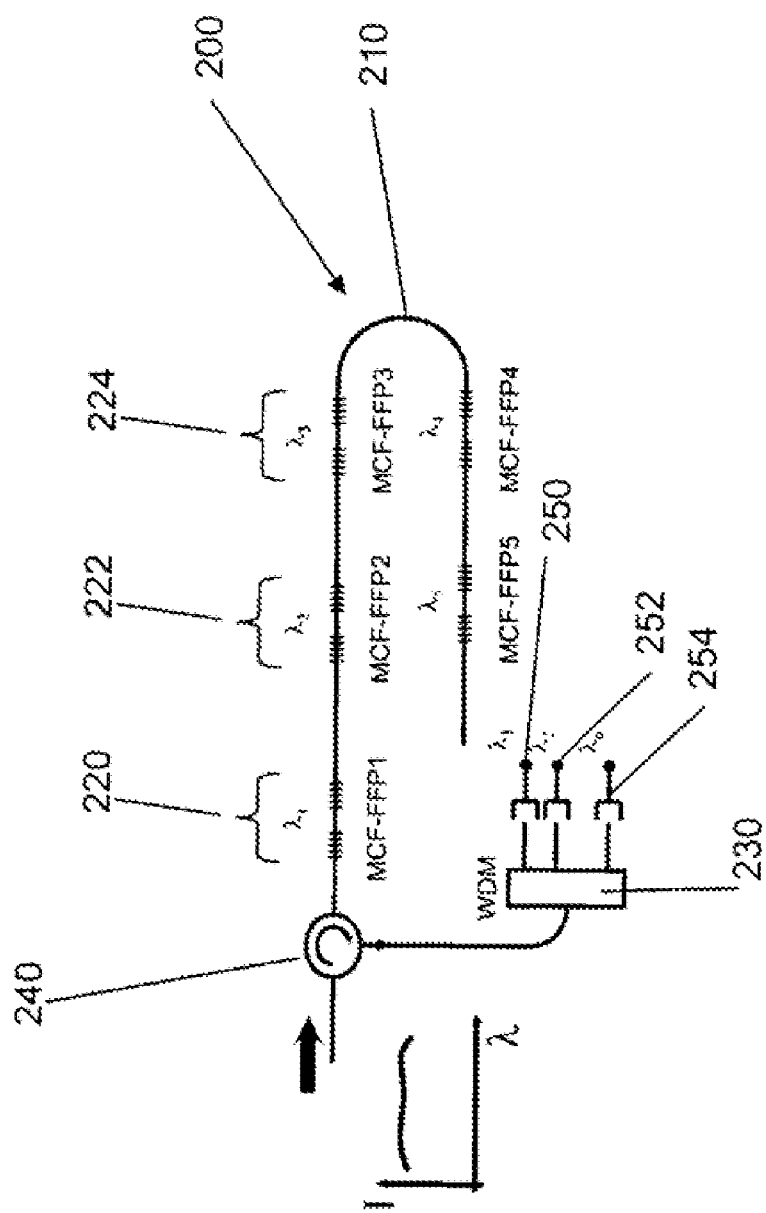
FIG. 2 is a schematic view of an illustrative wavelength division multiplexed curvature sensor system according to an embodiment of the instant invention.

In another embodiment of the instant invention, the sensing length is precisely defined by the FBGs 20, 22, 24, 26 and can be varied by increasing the spacing between the FBGs. Increasing the sensing length will increase the sensor responsivity. By way of example, a FFP sensor 10 according to this embodiment provides at least an order of magnitude increase in the curvature responsivity compared with the FBG curvature sensor embodiments described for example in Flockhart et al., "Two-axis bend measurement with Bragg gratings in multicore optical fiber," Opt. Lett., 2003, 28, (6), pp. 387-389, incorporated herein by reference, and still maintains the advantages of the latter sensor embodiments such as temperature insensitivity. Illustrative embodiments of this FFP sensor configuration are described as follows. The use of wavelength-dependent FBGs to form the cavities permits the use of wavelength division multiplexing by forming multiple curvature sensors 220, 222, 224 along a single MCF 220 and varying the wavelength of each sensor as shown by way of example in FIG. 2. The separation in wavelength between two adjacent FFPs will depend on the maximum wavelength excursion expected by the gratings comprising each FFP. Standard wavelength demultiplexing techniques can be used to separate the signals from different sensors such as interference filter-based wavelength demultiplexers 230 or arrayed-waveguide gratings. This would be placed at the output of the circulator 240 in FIG. 1(*b*) and an individual detector 250, 252, 254 is used for each wavelength.

Figure 3:
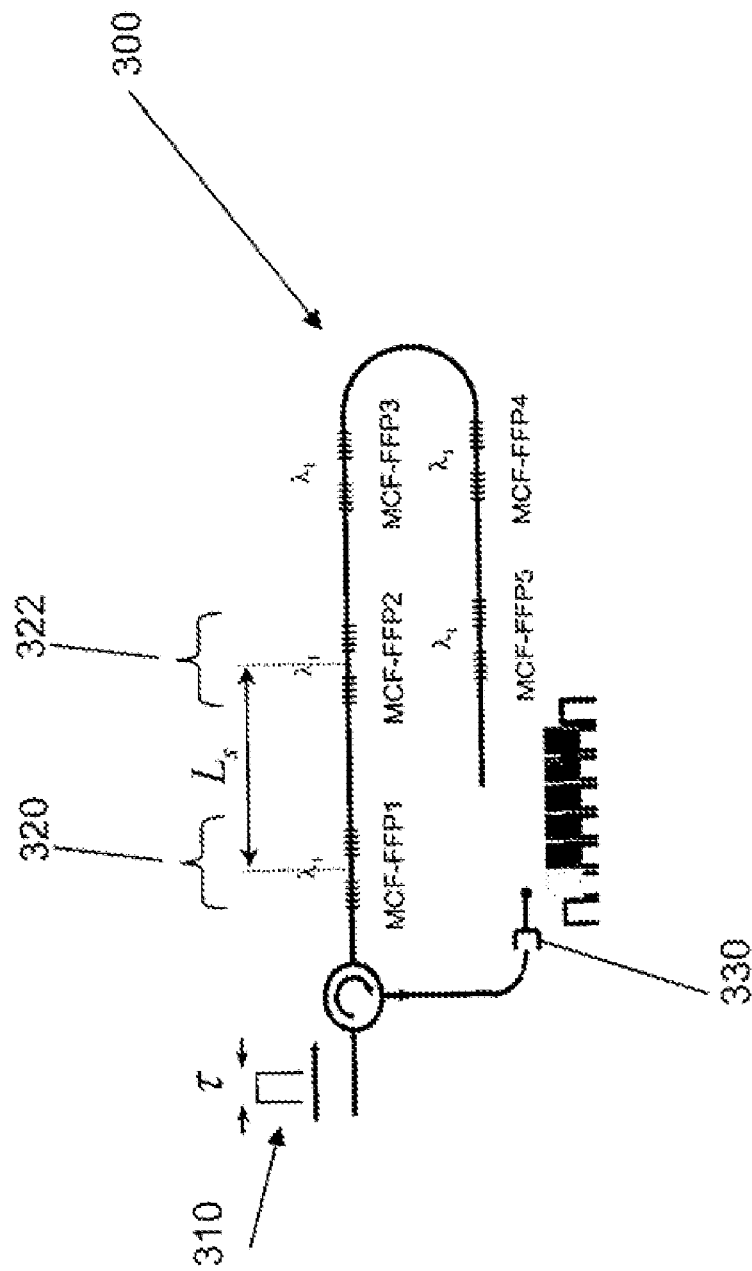
FIG. 3 is a schematic view of an illustrative time division multiplexed curvature sensor system according to an embodiment of the instant invention.

In a time-division multiplexed embodiment 300 of the instant invention, shown by way of example in FIG. 3, time division multiplexing is optionally used if the source is a pulsed broadband laser, such as a mode-locked laser (MLL) or semi-conductor amplifier (SOA), and consecutive sensors are spatially separated. A pulse 310 is injected into an array of sensors; the reflections from each pair of FBGs forming a FFP cavity 320, 322 overlap at the detector 330 and generate an interference fringe, the phase of which is decoded to obtain the strain of the corresponding FFP cavity. The spatial separation of the cavities 320, 322 must be such that reflections from consecutive cavities do not overlap at the detector 330. This condition is met if the separation between consecutive cavities, $L_s$, is made larger than $c\tau/(2n)$ where $\tau$ is the pulse width, c is the free space light velocity and n is the core refractive index. For example, for a pulse width $\tau$=10 ns, the sensor spacing is~1m. Well-known techniques are optionally used to digitize or gate the received signal to extract the fringe signal for each FFP. In this configuration, the wavelengths of each FBG can be nominally the same and the reflectivities of the FBGs should be made as low as possible so that the incident optical radiation is not rapidly deflected and crosstalk due to multiple reflections is minimized. However, they should be made strong enough such that sufficient power is received at the photodetector to obtain an optimum phase resolution. For ease of explanation only, it has thus far been assumed that the reflectivity of the FBGs is sufficiently low to minimize crosstalk and to maintain a constant return power from each sensor. However, for large number of sensors, there will be some variation in returned power from the sensors due to the depletion of the input optical signal on propagation through the array as well as manufacturing variations in the FBG reflectivities. If the power reflectivity of the FFP is $r_{ffp}$ and we neglect fiber attenuation, then the difference in power between the first sensor and sensor i is $(1-r_{ffp})^{2n-n}$. Thus, for i=50 and $r_{ffp}$=1%, the maximum power variation is 4.3 dB. This reduces to 1.1 dB for $r_{ffp}$=0.25%. This amount of variation is easily managed in a typical interrogation system.

Figure 4:
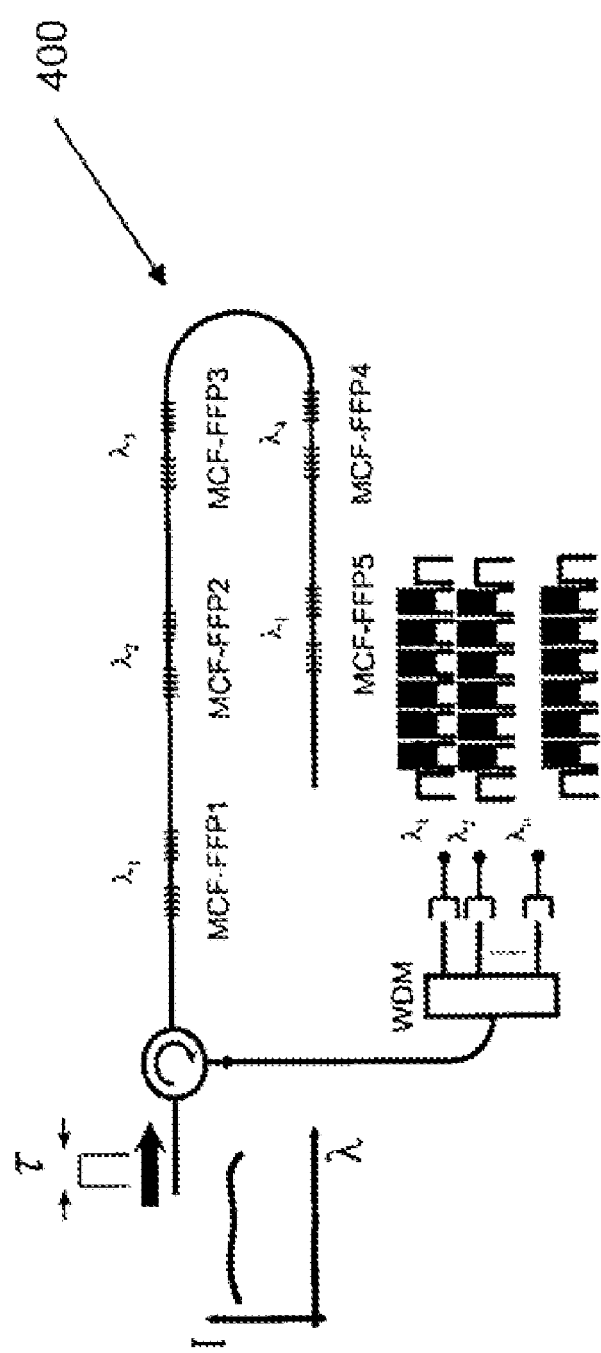
FIG. 4 is a schematic view of an illustrative time and wavelength division multiplexed curvature sensor system according to an embodiment of the instant invention.

In another embodiment 400 of the instant invention, both time and wavelength division multiplexing are optionally combined to multiplex large numbers of sensors onto a single fiber with high sensor density since the spatial separation of sensors is not limited with WDM, such as shown by way of example in FIG. 4. Sensors according to this embodiment are grouped into a series of wavelengths that is then periodically repeated. The spatial separation between sensors at the same wavelength must meet the criteria defined above for time division multiplexing.

Figure 5B:
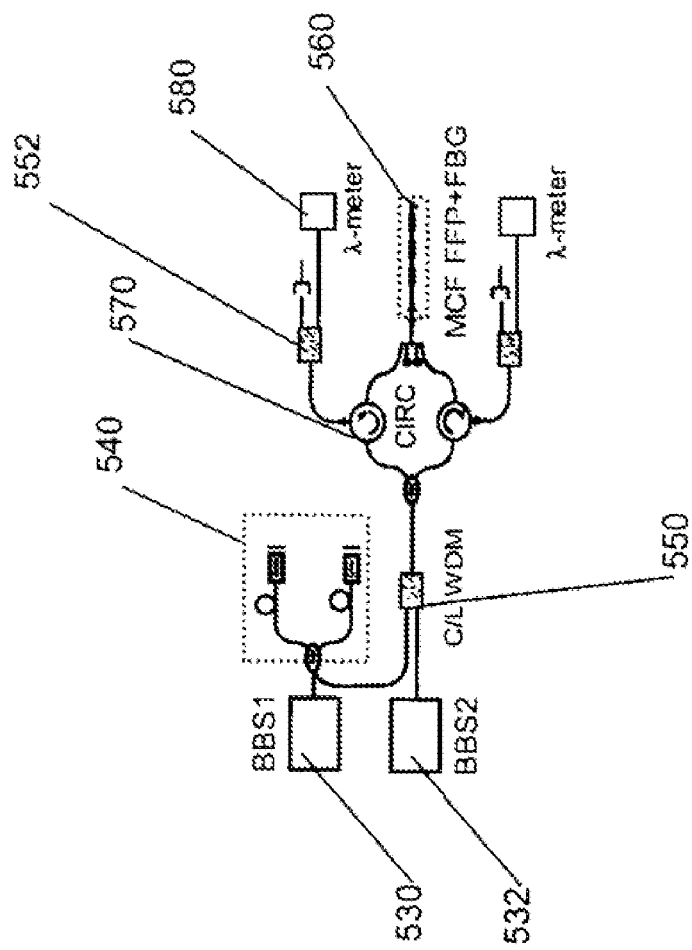
FIG. 5(b) is a schematic view of an illustrative hybrid curvature sensor system according to an embodiment of the instant invention.
Figure 5A:
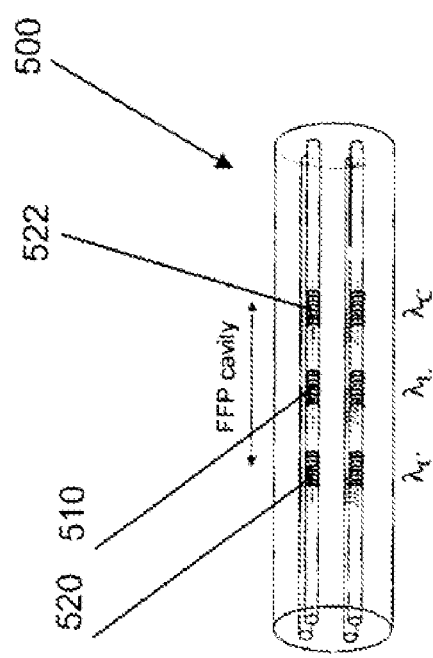
FIG. 5(a) is a perspective view of a hybrid curvature sensor according to an embodiment of the instant invention.

Another embodiment 500 of the instant invention includes a combined filter Fabry-Perot sensor and fiber Bragg grating sensor for absolute referencing. There is no absolute reference when interferometry is used to measure strain. The strain state of the fiber at the time of switch on of the measuring instrument is not known. Curvature sensor 500 is a solution to this problem and is shown by way of example in FIGS. 5(*a*)-(*b*). Another FBG 510 is written between the two FBGs 522, 524 making up the FFP cavity (or it can be written adjacent to the FFP cavity). The wavelength of this third FBG 510 should be much different from the other two. For example, the FBGs 522, 524 making up the FFP optionally has a wavelength in the C-band, $\lambda_C$, and the third FBG 510 optionally has a wavelength in the L-band, $\lambda_L$.

Interrogation of this sensor may require two broadband sources or one ultra-broadband source. As shown by way of example in FIG. 5(*b*), BBSI 530 generates radiation in the C-band and BBS2 532 generates radiation in the L-band. The output from BBS1 530 is injected into the MI 540 and then into a C/L band combiner WDM 550. This combines it with the direct output of BBS2 532. The combined signals are then injected into the MCF 560, as before. The return signals from each core are separated with a circulator 570 and then the signals from the FFP and FBG sensors are separated with another C/L WDM 552. The C-band signals are processed as before and the L-band signals are processed with a wavelength meter or equivalent. Thus the $\lambda_L$ signals provides the absolute reference with an accuracy equivalent to about 1 $\mu\epsilon$ and the $\lambda_C$ signals provide ultra-high resolution measurement of the strain changes with accuracy on the order of 1-10 n$\epsilon$. Interrogation of the reference FBG 510 is, for example, carried out with a scanning Fabry-Perot filter approach or wavemeter 580.

Another embodiment of the instant invention, shown by way of example in FIGS. 6(*a*)-(*c*), includes a twisted fiber MCF-FFP 600 to distinguish torsion and bending simultaneously. For example, such as MCF-FFP embodiment is capable of measuring both curvature and twist of the fiber simultaneously. The sensor includes two closely spaced rosettes 610, 612 that can be multiplexed with WDM. A MCF-FFP formed in a section of straight fiber will not exhibit sensitivity to twist of the fiber, to first order. However, a MCF-FFP curvature sensor is optionally made to be sensitive to torsion by adding a bias torsion to the fiber as illustrated in FIGS. 6(*a*)-(*c*). This bias torsion is optionally added by locally heating the fiber close to its melting point, in the region where the bias twist is to be added, while a torsion force is applied. The torsion force will cause the fiber to twist when it approaches its melting point and the twist will be permanently imprinted when the fiber cools.

The phrase responsivity of a core in this type of twisted MCF 600 to applied twist is calculated as follows. When a bias twist, $\theta_b$, is applied over a length equal to cavity length in a straight fiber, l, the new cavity length is given by, $$L = (l^2 + (\theta_b r)^2)^{1/2} \quad (10)$$

If a small twist, $\delta\theta,(=\theta_b)$ is applied to the fiber then the new length of the cavity is given by expanding (10) in a Taylor series about $\theta_b+\delta\theta$, $$L'(\theta_b + \delta\theta) = L(\theta_b) + \delta\theta \cdot \partial L(\theta_b)/\partial \theta_b \qquad (11)$$
$$= (l^2 + (\theta_b r)^2)^{1/2} + \delta\theta \cdot r^2 \theta_b (l^2 + (\theta_b r)^2)^{-1/2}$$

The induced strain is then given by, $$\delta\varepsilon = \frac{L'-L}{L} = \delta\theta \cdot \frac{r^2 \theta_b}{l^2}\left(1+\left(\frac{\theta_b r}{l}\right)^2\right)^{-1} \qquad (12)$$

The strain response slope, $\delta\varepsilon/\delta\theta$, is plotted in FIG. 11(*a*) for l=5 cm and r=35 μm as a function of twist rate, $\theta_b l$). There is an optimum responsivity achieved when $ll(r\theta_b)=1$. This corresponds to $\theta_b$:1.43×10³ rads. The noise equivalent twist, $\delta\theta$, can be calculated from the following equation, $$\delta\theta_n = \left(1+\left(\frac{\theta_b r}{l}\right)^2\right)\frac{l^2}{\theta_b r^2}\delta\varepsilon_n \qquad (13)$$

where $\delta\varepsilon_n$ is the strain resolution. Thus, with no bias twist, the sensor will not exhibit any sensitivity (to first order) to applied twist. If a straight (untwisted) fiber sensor is followed by a twisted fiber section, then the difference in measured phase between cavities in the same core will yield a measure of applied twist.

In another embodiment of the instant invention, a core running through the center of the MCF does not exhibit any sensitivity to twist, even with a bias twist present since according to (12), $\delta\varepsilon=0$ when r=0. Such a core is optionally used as a reference cavity instead of a separate FFP rosette in a straight section of fiber as described above. A multiplexed array of curvature and twist sensors is optionally implemented using the time and wavelength division multiplexing methods described above.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. An apparatus comprising:
a multicore fiber comprising three cores, said three cores comprising two pairs of cores, each pair of cores lying in a plane, said planes of the two pairs of cores being non-coplanar,
said multicore fiber comprising a rosette, said rosette comprising three coplanar interferometers, each interferometer of said three interferometers being located in a respective core of said three cores, said each interferometer comprising a first reflector and a second reflector, said first reflectors of said rosette being coplanar, said second reflectors of said rosette being coplanar.

2. The apparatus according to claim 1, wherein, for said each interferometer, said first reflector comprises a first fiber Bragg grating, said second reflector comprises a second fiber Bragg grating, said first fiber Bragg grating and said second fiber Bragg grating comprise a substantially similar fiber Bragg resonance.

3. The apparatus according to claim 2, further comprising a reference reflector adjacent to said each interferometer, said reference reflector comprising a third fiber Bragg grating comprising a second fiber Bragg resonance outside a bandwidth of said first fiber Bragg resonance.

4. The apparatus according to claim 2, further comprising:
a reference reflector within said each interferometer, said reference reflector comprising a third fiber Bragg grating comprising a second fiber Bragg resonance outside a bandwidth of said first fiber Bragg resonance.

5. The apparatus according to claim 1, wherein said three cores comprise substantially similar material.

6. The apparatus according to claim 1, further comprising a first section and a second section, said rosette comprising a first rosette and a second rosette, said first section comprising said three cores tracing a helical path centered about the central fiber axis and said second section comprising said three cores parallel to each other and the central fiber axis, at least one of said first section comprising said first rosette and said second section comprising said second rosette.

7. The apparatus according to claim 1, further comprising:
a path-matching interferometer communicating with said multicore fiber.

8. The apparatus according to claim 7, wherein said path-matching interferometer comprises one of a Mach-Zehnder interferometer, a Michelson interferometer, and a low-finesse Fabry-Perot interferometer.

9. The apparatus according to claim 8, wherein said Michelson interferometer comprises plurality of Faraday rotator mirrors.

10. The apparatus according to claim 1, further comprising one of a continuous wave light source and a pulsed broadband light source.

11. The apparatus according to claim 10, wherein said continuous wave light source comprises one of an erbium light source, a praseodymium light source, a semiconductor optical amplifier, a super continuum light source, and a super luminescent diode, and wherein said pulsed broadband light source comprises one of a semiconductor optical amplifier, a mode locked laser, and a switched super luminescent diode.

12. A method comprising:
coupling launched light to a multicore fiber comprising three cores, the three cores comprising two pairs of cores, each pair of cores comprising a plane, the planes of the two pairs of cores being non-coplanar, the multicore fiber comprising a rosette, the rosette comprising three interferometers, each interferometer of the three interferometers being located in a respective core of the three cores, each interferometer comprising a first reflector and a second reflector, the first reflectors of the rosette being coplanar, the second reflectors of the rosette being coplanar:
receiving reflected light from the interferometers; and
demultiplexing the received reflected light to extract interferometric signals from the three interferometers.

13. The method according to claim 12, further comprising:
transmitting a beam from a light source into a path-matching interferometer;
transmitting a beam from the path-matching interferometer;
splitting the beam transmitted from the path-matching interferometer into at least three paths;

passing the three paths through a splitter to separate the launched light from the reflected light.

14. The method according to claim 13, wherein said passing the three paths through a splitter to separate the launched light from the reflected light comprises passing the three paths using one of a circulator and a coupler.

15. The method according to claim 12, said demultiplexing the received reflected light to extract interferometric signals from the three coplanar interferometers comprises:
spectrally separating the received light using a wavelength demultiplexer into wavelength channels; and
transmitting the wavelength channels to respective detectors.

16. The method according to claim 15, said demultiplexing the received reflected light to extract interferometric signals from the three interferometers comprises:
separating the light at each wavelength using a time division demultiplexer into a plurality of time channels, each time channel of the plurality of time channels comprising a respective interferometric signal from a respective interferometer of the three interferometers.

17. The method according to claim 12, said demultiplexing the received reflected light to extract interferometric signals from the three interferometers comprises:
separating the received light from the three interferometers using a time division demultiplexer into a plurality of time channels, each time channel of the plurality of time channels comprising a respective interferometric signal from a respective interferometer of the coplanar interferometers.

18. The method according to claim 13, wherein the light source comprises one of a continuous wave light source and a pulsed broadband light source.

19. The apparatus according to claim 18, wherein the continuous wave light source comprises one of an erbium light source, a praseodymium light source, a semiconductor optical amplifier, a super continuum light source, and a super luminescent diode, and wherein the pulsed broadband light source comprises one of a semiconductor optical amplifier, a mode locked laser, and a switched super luminescent diode.

* * * * *